US005083926A

United States Patent [19]

Kissinger et al.

[11] Patent Number: 5,083,926

[45] Date of Patent: Jan. 28, 1992

[54] MEANS FOR RETAINING CONNECTOR TO PRINTED CIRCUIT BOARD

[75] Inventors: Paula A. Kissinger, Harrisburg, Pa.; Joseph J. Kratzer, Elmont, N.Y.

[73] Assignee: AMP Incorporated, Harrisburg, Pa.

[21] Appl. No.: 786,456

[22] Filed: Oct. 11, 1985

[51] Int. Cl.[5] .......... H01R 13/00; F16B 19/08

[52] U.S. Cl. .......... 439/78; 411/501; 411/509

[58] Field of Search .......... 411/59, 61, 82, 84, 411/107, 34-38, 352, 362, 363, 449, 450, 448, 501-507; 24/293, 295; 339/14 R, 143 R; 439/78

[56] References Cited

U.S. PATENT DOCUMENTS

| | | | |
|---|---|---|---|
| 388,443 | 8/1888 | Platt | 411/57 |
| 3,217,584 | 11/1965 | Amesbury | 411/508 |
| 3,271,059 | 9/1966 | Pearson | 411/509 |
| 3,355,701 | 11/1967 | Biba | 339/126 R |
| 4,017,142 | 4/1977 | Clark et al. | 411/38 |
| 4,512,618 | 4/1985 | Kumar | 339/14 R |

FOREIGN PATENT DOCUMENTS

| | | | |
|---|---|---|---|
| 877784 | 9/1942 | France | 411/502 |
| 156534 | 4/1978 | Netherlands | 411/509 |

*Primary Examiner*—Neill R. Wilson
*Attorney, Agent, or Firm*—David L. Smith

[57] ABSTRACT

Closed end rivet with slots in shank is assembled to flange of an electrical connector and subjected to axial compression to radially expand exposed portion of shank and thus assure compliant fit in mounting hole through printed circuit board.

4 Claims, 4 Drawing Sheets

FIG. 3
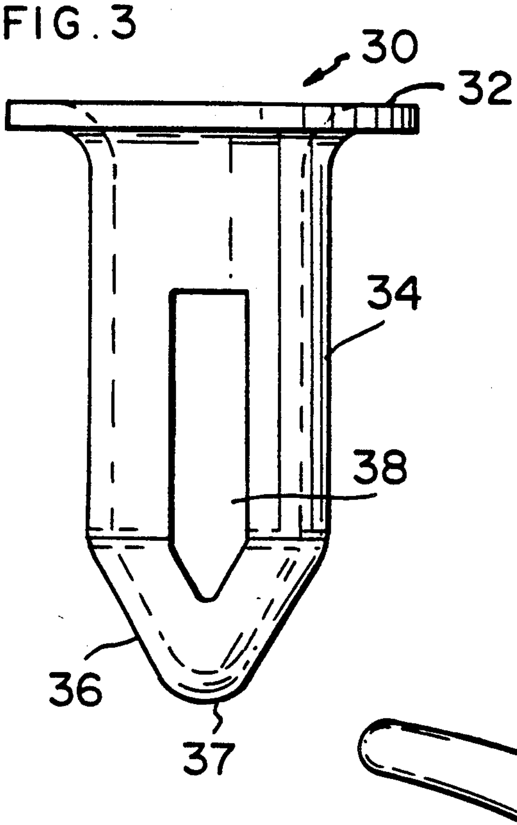
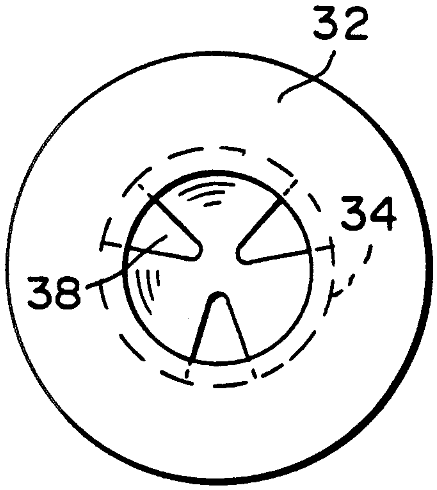
FIG. 4
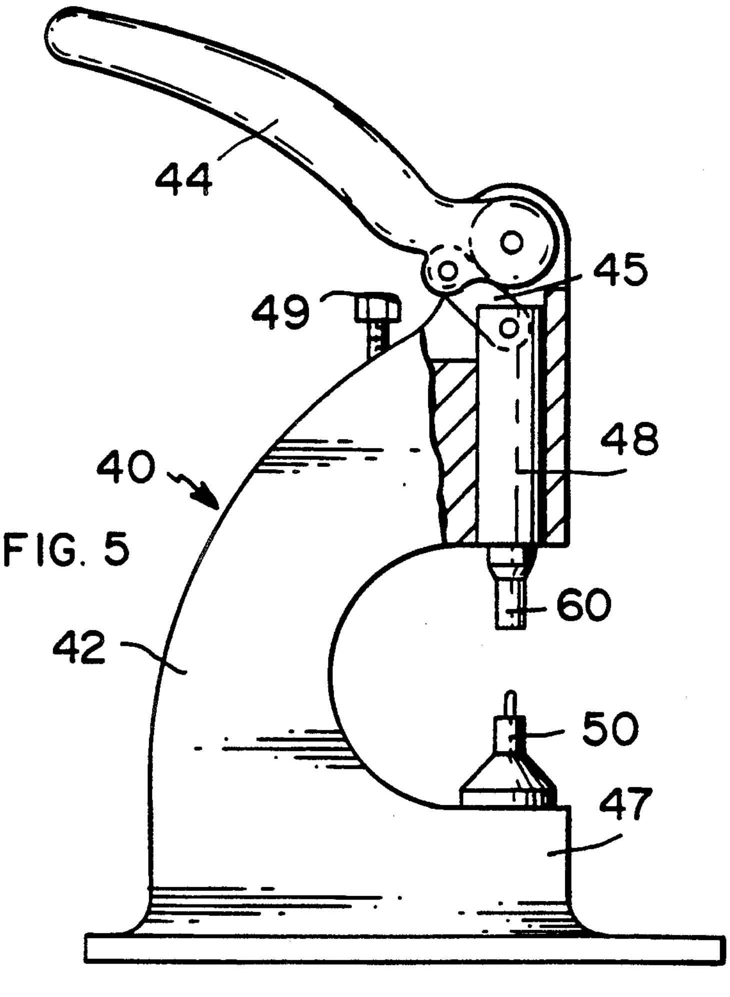
FIG. 5

MEANS FOR RETAINING CONNECTOR TO PRINTED CIRCUIT BOARD

BACKGROUND OF THE INVENTION

The present invention relates to a connector assembly having specially formed rivets to retain it to a printed circuit board.

U.S. Pat. No. 4,512,618 discloses an electrical connector for mounting to a printed circuit board. The connector includes an elongate dielectric housing having flanges at opposite ends thereof, the flanges having coplanar mounting surfaces received against the board. Each flange has a hole therethrough which is aligned with a respective hole in the board for riveting the connector to the board, which operation requires use of tooling on the opposite side of the board.

SUMMARY OF THE INVENTION

According to the invention, a connector as described above is provided with drawn rivets each having a flange, a tubular shank, and a generally conical closed end tapering from the shank to a tip remote therefrom. The shank has elongate slots therein which generally parallel the axis of the shank, each rivet being received in a hole through a respective flange and subjected to axial compression so that the slots open and the shank expands radially between the mounting face and the closed end. When the connector is assembled to a printed circuit board, the expanded portion of each shank compresses radially to comply to the printed circuit board hole and provides retention until contacts in the connector are soldered to the board.

When the connector is so assembled to the printed circuit board, the closed ends extend below the board and thus may be readily exposed to a wave soldering simultaneously with any solder tails extending through the board from the connector. The slots in the shank extend into the conical end as well and permit solder to flow into the end and the shank. Since any exposed shank will still have a larger diameter than the printed circuit board hole, the solder will thus enhance mechanical retention by preventing collapse of any exposed portion of the shank.

BRIEF DESCRIPTION OF THE DRAWINGS

FIG. 3 is a side view of the rivet.

FIG. 4 is an end view of the rivet.

FIG. 5 is a side view of the assembly apparatus.

FIG. 6 is a side view of the lower and upper insertion tool with the rivet and connector between.

FIG. 7 is a side view of the lower insertion tool and upper forming tool with the assembled connector and rivet between.

DETAILED DESCRIPTION OF THE PREFERRED EMBODIMENT

Figure 1:
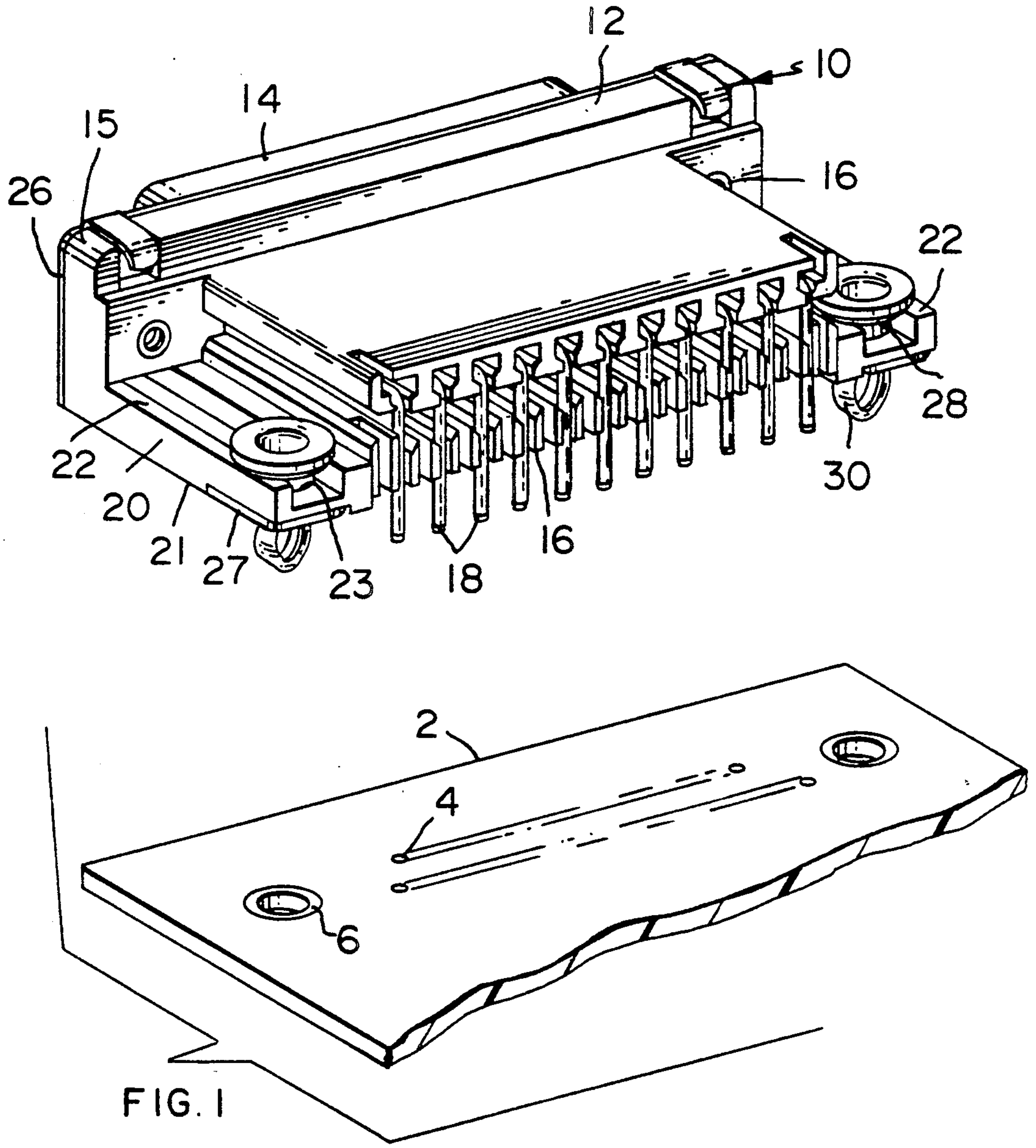
FIG. 1 is a perspective of the connector assembly exploded from a printed circuit board.
Figure 2:
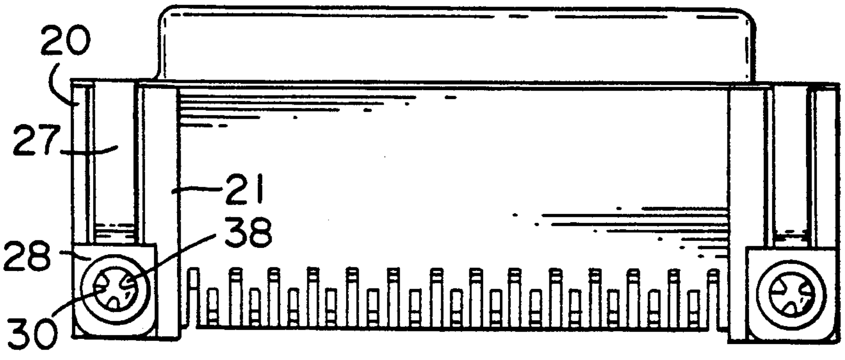
FIG. 2 is a bottom view of the connector.
Figure 9:
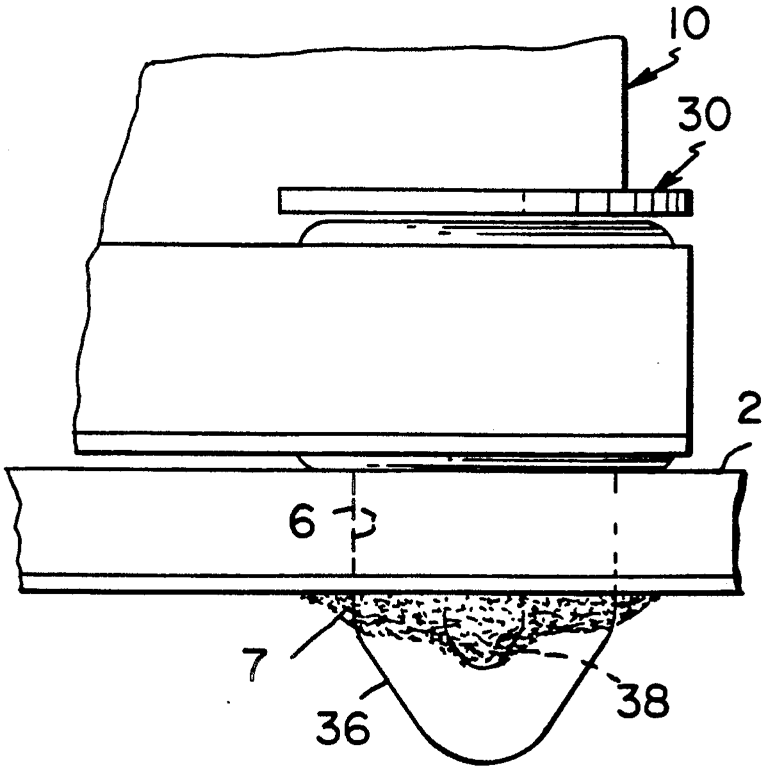
FIG. 9 is an end view of the connector assembly to a printed circuit board with solder.

Referring to FIG. 1, a right angle connector 10 comprises a housing 12 molded to thermoplastic and having a mating face 14 and a bottom face 16 at a right angle thereto with a plurality of terminal receiving passages 11 extending thereinto. The mating face 14 is surrounded by a flange 15 having holes 17 at opposite ends thereof for securing a complementary connector thereto. The bottom face 16 has solder tails 18 extending therefrom for reception in plated through holes 4 of a printed circuit board 2, and flanges 20 at opposite ends. Referring also to FIG. 2, each flange 20 has a mounting face 21, an opposed holding face 22, and a hole 23 therebetween. A formed metal shield 26 on the mating face 14 has grounding straps 27 extending to respective mounting faces 21, which straps 27 are secured by eyelets 28 through respective holes 23. The eyelets 28 thus define the holes 23′ (FIG. 6), which holes 23′ receive respective rivets 30 in a press fit as will be described. The rivets 30 extend from the coplanar mounting faces 21 for press fit in mounting holes 6 in the board 2. The holes 6 are plated through and connect with grounding traces 8 (FIG. 9) on the board, whereby the shield 26 is grounded.

Referring to FIGS. 3 and 4, the rivet 30 is deep drawn from a brass disc to form a tubular shank 34 extending from an annular flange 32 to a closed end 36 which is generally conical, tapering from shank 34 to a tip 37 remote therefrom. Elongate slots 38 parallel to the axis of the shank 34 and are cut from the conical surface of closed end 36 into the shank 34, as by skiving, and the blanks are trimmed proximate flange 32. The rivet 30 so formed is then tin plated. A rivet so manufactured is state of the art, being available from the Edwin B. Stimpson Company of Bayport, N.Y.

Figure 6:
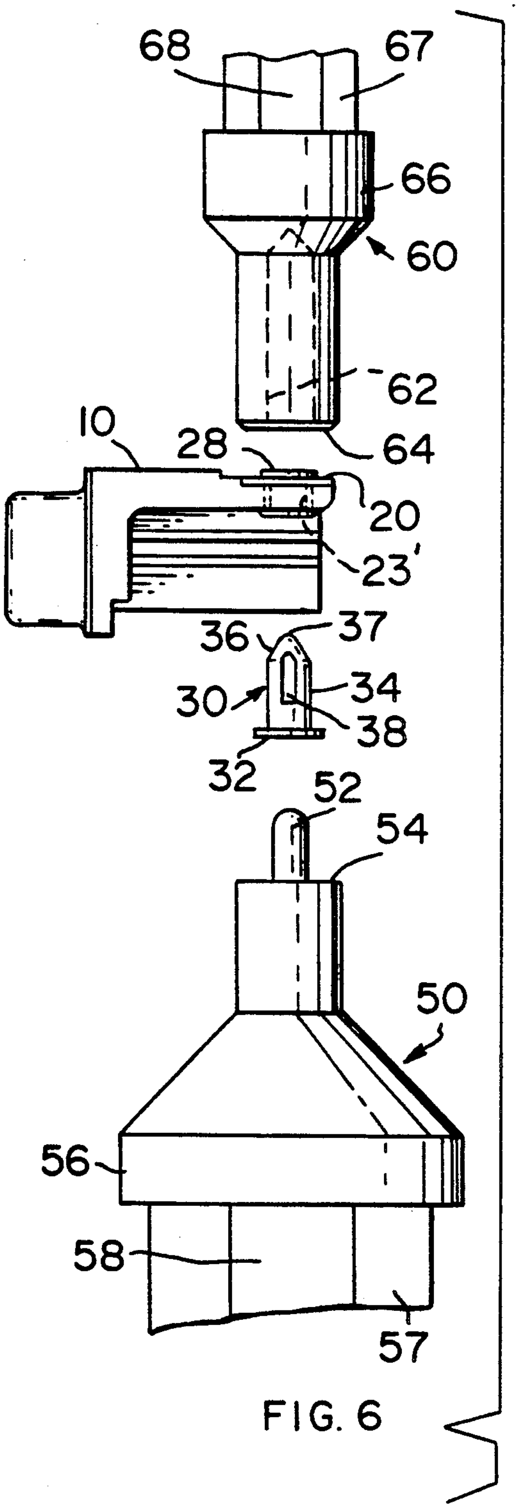

FIG. 5 is a view of the apparatus 40 used to assemble the rivet 30 to connector 10. The apparatus comprises a frame 42 having a handle 44 pivoted thereto, the handle driving a pivot link 45 which drives vertical link 48 downward toward support 47, thus driving upper insertion tool 60 toward lower insertion tool 50. Referring to FIG. 6, the lower tool 50 is machined from tool steel and comprises a post 52 upstanding from anvil 54, the tool further comprising a collar 56 and a base 57 with flat 58 thereon to facilitate fixing to support 47. The upper insertion tool 60 has a hole 62 bored in anvil 64 in axial alignment with post 52, the tool 60 further comprising collar 66, base 67, and flat 68 to facilitate mounting to vertical link 48.

Figure 7:
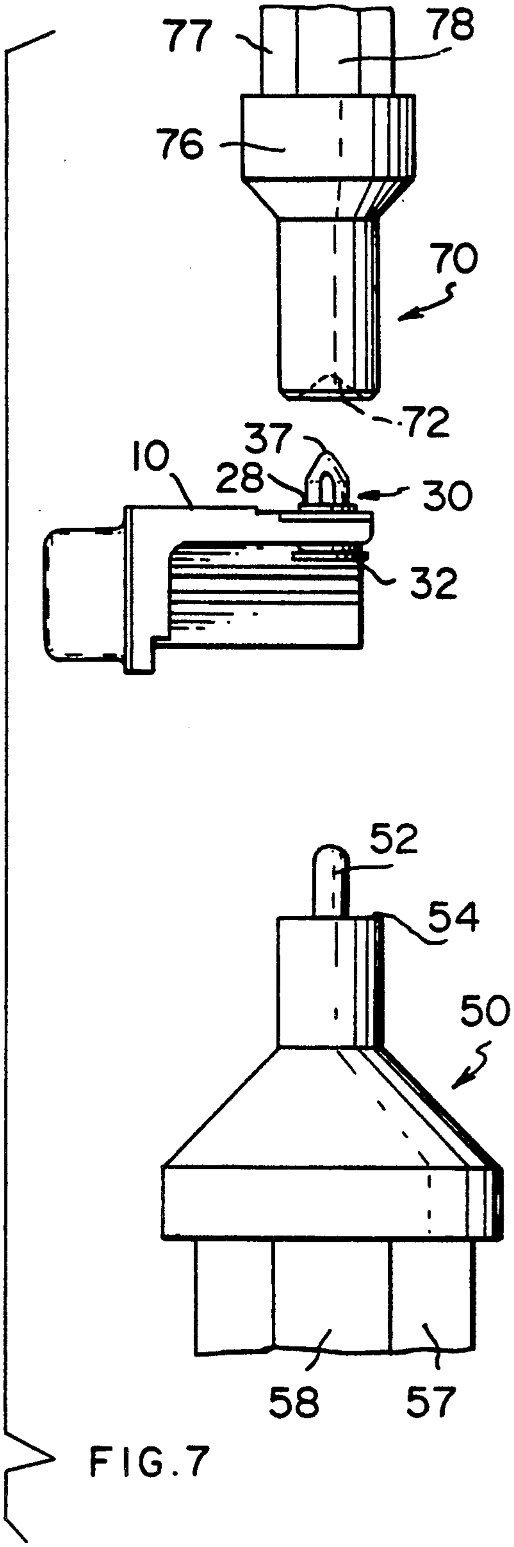
Figure 8:
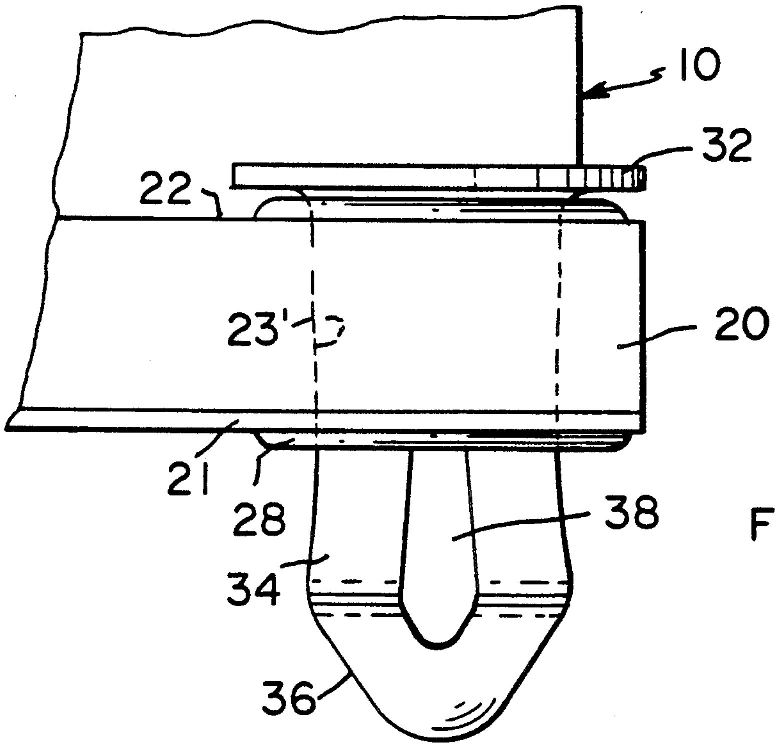
FIG. 8 is a partial end view of the finished connector assembly.

Referring still to FIG. 6, for the first assembly step it is most convenient to partially insert the closed end 36 of rivet 30 into hole 23′ defined by eyelet 28. Since diameter tolerances of the rivet 30 and eyelet 28 are closely controlled, a press fit is assured. The shank 34 of rivet 30 is then received on post 52 with annular flange 32 against anvil 54, and upper tool 60 is advanced so that anvil 64 bears on connector flange 20 and forces it on rivet 30, the closed end 36 being received in hole 62. During insertion of shank 34 into hole 23′, limited radial collapse occurs. Referring to FIG. 7, the next step is to align the connector 10, with rivet 30 assembled thereto, between lower tool 50 and an upper forming tool 70 in a like apparatus 40 (FIG. 5). The tool 70 has a depression 72, as well as a collar 76, base 77, and flat 78 to facilitate fixing to vertical link 48. The rivet 30 is again received on a post 52 with flange 32 against anvil 54, and the forming tool 70 advanced axially theretoward so that tip 37 is centered in depression 72 and axial compressive force is applied to the rivet 30. This causes radial expansion of the shank 34 between the mounting face 21 and end 36, the slots 38 opening slightly to permit the expansion. The travel of upper forming tool 70 is determined by adjusting stop 49 on apparatus 40 so that a desired final diameter, greater than the diameter of the hole 23' defined by eyelet 28, is achieved. The rivet 30 so formed is somewhat bulbous, as shown in FIG. 8.

The expanded portion of shank 34 and closed end 36 will undergo radial collapse upon insertion into the mounting hole 6 of a printed circuit board, assuring a good press fit regardless of tolerance deviation in the diameter of holes 6. The press fit assures that the connector 10 remains solidly anchored to board 2 during soldering, which yields the configuration of FIG. 9, where further advantages of the invention appear. Since the lower ends of slots 38 are exposed to the solder bath, solder is drawn into the end 36 and shank 34 as well as to fluxed areas of plating about hole 6, thus providing an anchor passing through the rivet 30. Where the closed end 36 protrudes sufficiently from board 2, the expanded portion will remain larger than hole 6 due to resiliency, the solder 7 maintaining the larger diameter for additional anchoring.

The foregoing is exemplary and not intended to limit the scope of the claims which follow.

We claim:

1. A method of securing an electrical connector having a flange with a holding face, a mounting face and an aperture extending therebetween to a printed circuit board having an aperture therein, comprising the steps of:

inserting a rivet having flange means and a tip remote therefrom into the aperture in the connector flange with the flange means against the holding face and the tip extending beyond the mounting face; and radially expanding the rivet such that the portion of the rivet between the mounting face and the tip of the rivet extends beyond the aperture in the connector flange, whereby when the radially expanded rivet is inserted into the aperture in the printed circuit board, the electrical connector is secured thereto.

2. A method of securing an electrical connector to a printed circuit board as recited in claim 1 wherein radially expanding the rivet is achieved by axially compressing the rivet, whereby as a compressive force is applied to the rivet a portion of the shank thereof expands radially.

3. A method of securing an electrical connector to a printed circuit board as recited in claim 1 further comprising the step of inserting the expanded portion of the rivet into the aperture in the printed circuit board, whereby an interference fit is achieved between the expanded portion of the rivet and the aperture in the printed circuit board thereby securing the electrical connector to the printed circuit board.

4. A method of securing an electrical connector to a printed circuit board as recited in claim 1 further comprising the step of maintaining the flange means against the holding face subsequent to inserting the rivet into the aperture in the connector flange.

* * * * *